(12) United States Patent  
Kowalchuk (10) Patent No.: US 8,224,534 B2  
(45) Date of Patent: Jul. 17, 2012

(54) SYSTEM AND METHOD FOR AUTOMATICALLY CONTROLLING DECK PLATE POSITION ON A CORN HEADER

(75) Inventor: Trevor L. Kowalchuk, Saskatoon (CA)

(73) Assignee: CNH America LLC, New Holland, PA (US)

( * ) Notice: Subject to any disclaimer, the term of this patent is extended or adjusted under 35 U.S.C. 154(b) by 178 days.

(21) Appl. No.: 12/844,598

(22) Filed: Jul. 27, 2010

(65) Prior Publication Data

US 2012/0029757 A1 Feb. 2, 2012

(51) Int. Cl.
*G06F 19/00* (2011.01)

(52) U.S. Cl. .............. 701/50; 701/37; 701/38; 701/48; 701/52; 701/56; 701/59; 56/14.3; 56/99; 56/104; 56/105; 56/106; 56/119; 460/29; 460/36

(58) Field of Classification Search .............. 701/37, 701/38, 48, 50, 52, 56, 59; 56/14.3, 99, 104, 56/105, 106, 119; 460/29, 63
See application file for complete search history.

(56) References Cited

U.S. PATENT DOCUMENTS

| | | | |
|---|---|---|---|
| 2,618,113 A | 11/1952 | Hyman | |
| 3,496,708 A * | 2/1970 | Bornzin | ............................ 56/119 |
| 3,512,609 A * | 5/1970 | Ross | .............................. 182/129 |
| 3,552,398 A | 1/1971 | Looker | |
| 3,812,661 A * | 5/1974 | Baker | ............................ 56/14.4 |
| 3,885,375 A | 5/1975 | Solterbeck | |
| 4,086,749 A | 5/1978 | Greiner et al. | |
| 4,531,351 A | 7/1985 | Sousek | |
| 4,567,852 A * | 2/1986 | Ledwell et al. | ................ 119/846 |
| 5,060,464 A | 10/1991 | Caron | |
| 5,244,346 A * | 9/1993 | Fergusson | ..................... 416/142 |
| 5,680,750 A | 10/1997 | Stefl | |
| 5,878,559 A | 3/1999 | Cooksey et al. | |
| 5,878,561 A * | 3/1999 | Gunn | ................................ 56/98 |
| 6,237,312 B1 | 5/2001 | Becker | |
| 6,237,314 B1 | 5/2001 | Boll | |

* cited by examiner

*Primary Examiner* — James Trammell
*Assistant Examiner* — McDieunel Marc
(74) *Attorney, Agent, or Firm* — Michael G. Harris (57) ABSTRACT

The system and method automatically controls the position of at least one deck plate of a harvesting unit of a corn header so as to increase the width of a stalk receiving channel or reduce pinching forces between the plates when entering a stand of corn to facilitate alignment with the corn rows, and to change the position after a suitable time period or other condition or event, to narrow the channel width and/or increase pinching force, to reduce kernel loss while also monitoring forces exerted against the plates by the stalks and responsively adjusting the plate position for maintaining a desired force on the stalks or width.

15 Claims, 7 Drawing Sheets

SYSTEM AND METHOD FOR AUTOMATICALLY CONTROLLING DECK PLATE POSITION ON A CORN HEADER

TECHNICAL FIELD

This invention relates generally to controlling the position of at least one of the deck plates of a harvesting unit of a corn header for an agricultural harvesting machine such as a combine, and more particularly, to a system and method for automatically controlling the deck plate position, preferably in cooperation with an opposing biased or spring loaded plate, so as to expand or widen a stalk receiving or picking channel of the unit or reduce pinching forces to facilitate entry or induction of a row of standing corn stalks into the harvesting unit and reduce pushing down of the stalks by the unit, and then, while harvesting, monitoring pinching force exerted against the stalks, and adjusting the plate position for maintaining the channel width or pinching force at a desired or set level for advantages such as maintaining stalk throughput and reducing kernel loss.

BACKGROUND ART

Corn plants are typically planted in rows spaced a predetermined distance apart. Harvesting units of corn headers are spaced a corresponding distance apart so as to be capable of following the rows while inducting the corn plants. When entering and moving through a stand of corn, the harvesting elements of the harvesting units of the header are preceded by row dividers that separate the adjacent rows of plants for harvesting by the respective harvesting units. The harvesting units are configured and operable for receiving the stalks of the corn plants of the respective rows in succession, and removing the full or intact ears of corn, for conveying by other apparatus from the header to processing apparatus within the harvesting machine. Typical harvesting elements of a harvesting unit are located adjacent to the rear of the row dividers, bounding the stalk receiving channel, also referred to as the picking channel or gap. The harvesting elements can comprise a variety of devices operable for harvesting the corn ears from the stalks, including fore to aft moving gathering chains having teeth operable for carrying the corn ears rearwardly to the conveying apparatus of the header. The elements can also include fore and aft extending picking or snapping rolls located in association with the deck plates, which are also referred to as, or carry, stripper bars or plates also bounding the channel or gap. In a typical configuration, the gathering chains are located above the deck or stripper plates and the snapping rolls are located below. The snapping rolls are rotatable for pulling the corn stalk downwardly, through rearwardly moving fingers of the gathering chains, to bring the ears to bear against the top edges of the deck plates so as to be detached from the stalks thereby. The detached ears are then carried toward the rear of the header by the gathering chains for conveying by other apparatus into the harvesting machine, while the collapsed stalks are left on the field.

The typical harvesting unit includes a frame supporting the deck plates in spaced relation bounding the stalk receiving channels. The deck plates can be spaced a variety of distances apart. For instance, the spacing can be large such that a gap or space exists between the adjacent edge of the deck plate and the side of the stalks, on one or both sides of the stalks. Or, the spacing can be smaller, such that edges of the deck plates contact the sides and even pinch or squeeze the stalks. In the first instance, if the gap or space is large, an advantage is that more of the remaining plant residue or trash, e.g., leaves, stalks, husks, can fall through the enlarged channel so as not to build up in the harvesting unit, and not be conveyed into the harvester. But, a disadvantage is that the upper ends of the stalks are less supported, and may tend to whip around more as the lower ends are collapsed into the ground, raising the potential that some stalks will be broken and ears will be lost. Corn ears may also tend to get pulled down between the edges of the deck plates such that kernels are detached and lost. Smaller ears may also get caught between the opposing deck plates and cause trash buildup. In the second instance, if the pinch force is too great, stalks may get caught between the deck plates and bunch up in the channel and be damaged or broken such that, again, ears are lost, and more trash may be retained and carried by the gathering chains into the header.

As proposed solutions to the problems set forth above, it is known for the deck plates to be movable laterally, e.g., using an actuator such as a hydraulic cylinder, to allow adjusting the width of the stalk receiving channel, from the operator cab based on observations and/or operator preferences, mainly, based on estimates of stalk diameter, and/or to achieve good stalk flow into the harvesting units. However, if the operator lacks experience, or is inattentive, the channel width can be too big or small, resulting in the above listed problems. It is also known for the deck plates to be spring mounted to bring the edges of the deck plates to bear against the largest diameter stalks currently located therein while exerting a pinching force. This provides a degree of automatic adjustment and can eliminate gaps or spaces between the edges of the deck plates and the stalks. However, this force will be strictly a function of the spring constant and the degree of compression or extension thereof, if working properly. As another problem, sugars from the stalks and dust adhered thereby to the plates and surrounding structure so as to reduce and even overcome the spring forces and inhibit free lateral adjusting movements of the plates, such that they can stick open too widely or too narrowly so as to undesirably affect the pinching force, disrupt stalk flow and ear removal, and the like.

In some instances, such as when entering a stand of corn, it would be advantageous to have an ability to increase the deck plate spacing to open the stalk receiving channels to facilitate aligning the harvesting units with the rows and to reduce occurrence of laying or pushing the stalks over. Then, after good alignment is achieved, it would be advantageous to reduce the width of the channels to a size that best fits the stalk size of the corn being harvested and to exert a desired pinching force against the stalks for controlling kernel loss and the like.

Thus, what is sought is a manner of controlling deck plate positioning and stalk pinching force if utilized, which overcomes one or more of the shortcomings and problems, and provides one or more of the advantages, set forth above.

SUMMARY OF THE INVENTION

What is disclosed is a system and method for automatically controlling deck plate positioning and pinching force or stalk receiving channel width of a harvesting unit of a corn head, which overcomes one or more of the shortcomings, and provides one or more of the advantages, set forth above.

According to a preferred aspect of the invention, the system and method controls the position of at least one of the deck plates so as to automatically expand or increase the width of a stalk receiving channel between the plates when entering a stand of corn, to facilitate induction of and alignment with a row of stalks, and then, after elapse of a suitable time period or change in a condition, to move the plate to decrease the width of the channel and/or increase the pinching force. In the first instance, the pinching force can be set to a value, for instance, selected to prevent the ears from entering the stalk receiving channels before being detached such that the deck plates will not strip or remove significant amounts of kernels therefrom, and/or to support the stalks to reduce whipping of the upper ends thereof as they are collapsed. In the latter instance, a larger channel width may be desired to reduce trash accumulation and the like. According to another preferred aspect of the invention, while harvesting the pinching force is monitored, and the deck plate position responsively adjusted for maintaining it within a desired or set range, or for maintaining the channel width just larger than the stalks currently being processed.

According to another preferred aspect of the invention, a triggering event or condition, e.g., the raising of the header above a range of harvesting heights and/or the lowering the header to a harvesting height, is used as a signal to initiate automatic opening of the deck plates to expand the width of the stalk receiving channel and/or reduce the pinching force. To accomplish this, the entire channel can be expanded, or just one end thereof. Then, after a sufficient time period for aligning the channel with a row of stalks and entry of the stalks into the channel, which period can be initiated by an appropriate triggering event such as the detection or sensing of a force exerted against one or both of the plates, e.g., signifying presence of one or more stalks in the channel, the deck plate is automatically positioned to set the desired channel width and/or pinching force for controlling kernel loss and the like.

According to another preferred aspect of the invention, a processor based controller is used in connection with a sensor configured and operable for sensing information representative of the selected triggering event or condition, such as the height of the header, or absence of a force indicative of presence of stalks in the channel, and outputting the information to the controller. A sensor can also be provided which is configured and operable for sensing information representative of a force or forces exerted, such as against one or both of the plates, and outputting the information to the controller. This information can be, for instance, a pressure condition in a fluid system in connection with an actuator which positions the movable plate, an electrical current to the actuator, or the like, which force will preferably be representative also of the pinching force exerted by the plates against a stalk or stalks therebetween, if any. The controller is connected in operative control of an actuator configured and operable to adjust the deck plate position, and automatically controls the actuator responsive to the information received from the sensors for achieving a desired condition, e.g., a set width or pinching force.

According to another preferred aspect of the invention, only one of the deck plates is controllably movable in the above described manner, and the other deck plate is resiliently biased. As a result, in a typical configuration, in the absence of stalks in the stalk receiving channel, the biased deck plate will bear against a hard stop, or the biasing element will be in an unbiased or unloaded state. The controllably movable deck plate will be at a selected position, usually spaced some distance from the biased deck plate. When the movable plate is positioned for enlarging the channel, the channel width can be set to be larger than the diameter of the stalks to be received, or just smaller. In the latter instance, and/or when the stalks in the channel are offset from the center of the channel toward the biased plate, the biased plate will be displaced to a more open position. The system can also be operable such that if the stalks contact the controllably movable plate with a force sufficient to trigger a movement thereof, that plate will be responsively moved by the actuator to enlarge the channel and reduce the force. Then, after elapse of the time period, or other triggering event or condition, presumably the harvesting unit will be properly aligned with the row of stalks, and the actuator will move the plate to reduce the channel width to a set value, or to apply a pinching force if desired. Thereafter, depending on the force range or setting, when an increased force condition exists, the controllably movable plate will be repositioned to reduce the force to an acceptable level. The system can also be automatically operable such that if the pinching force is too low or absent, the controllable plate will be moved in a manner to increase the force to an acceptable level, or reduce or eliminate gaps or spaces between the edges of the plates and the sides of the stalks, for reducing kernel loss. This setting is preferably operator variable using a suitable input device to allow adjusting for other factors such as passage of trash through the channel, stalk whipping, and the like.

DETAILED DESCRIPTION OF THE INVENTION

Figure 1:
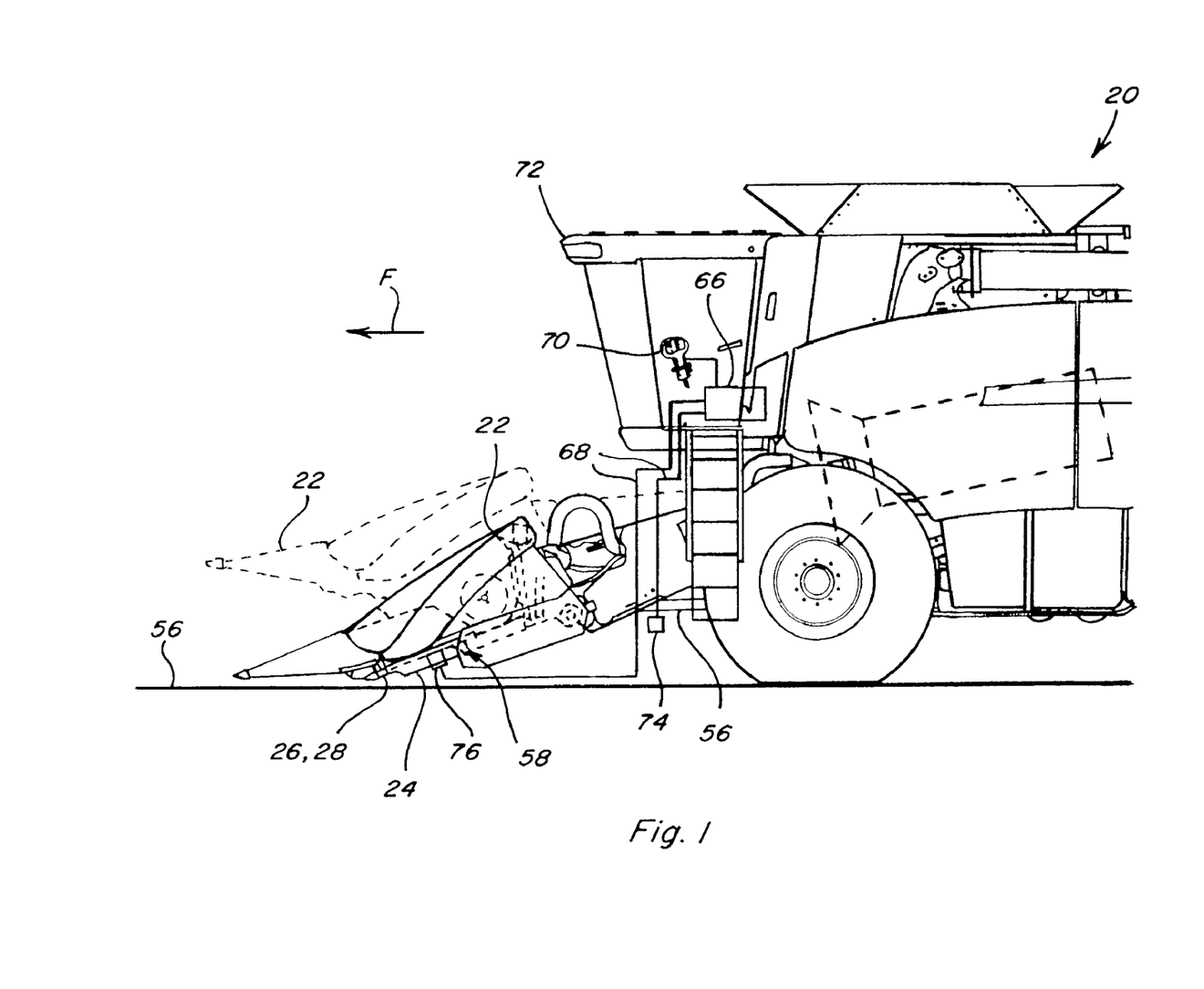
FIG. 1 is a fragmentary side view of the front end of an agricultural harvesting machine, including a corn header having a system for controlling deck plate positioning and pinching force or stalk receiving channel width of harvesting units of the header according to the present invention.
Figure 2:
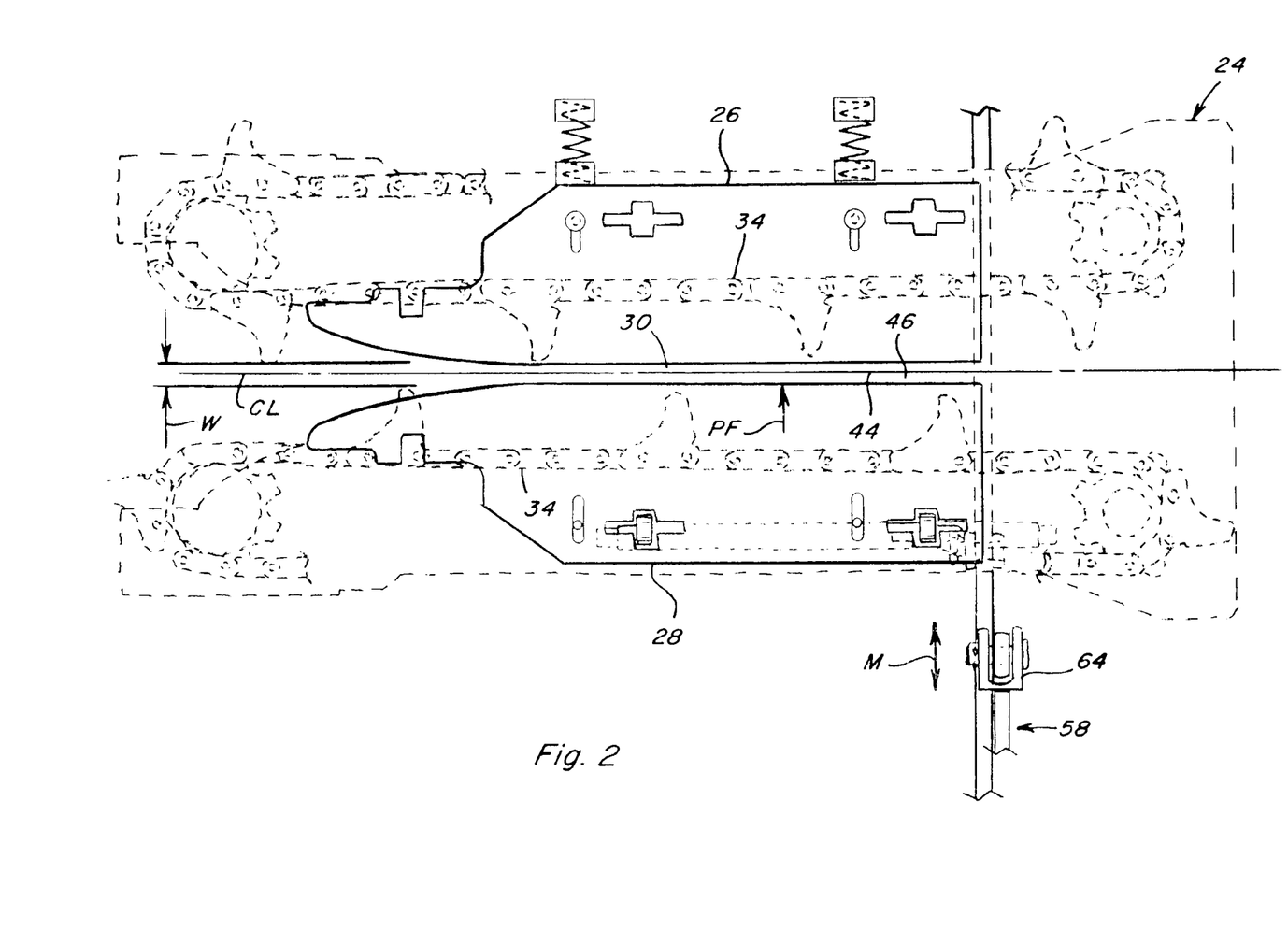
FIG. 2 is a simplified fragmentary top view of deck plates and other aspects of a representative harvesting unit of the header of FIG. 1.

Referring now to the drawings, in FIG. 1, a representative harvesting machine 20, which is a combine, is shown, including a corn header 22 including a row of harvesting units 24 (see also FIG. 4) constructed and operable according to the teachings of the present invention. Here, harvesting units 24 are configured as corn ear harvesting units operable for receiving and gathering the corn stalks as machine moves in a forward direction, denoted by arrow F, and collapsing the stalks downwardly toward the ground, while removing and collecting the corn ears for further processing by machine 20. To accomplish this, units 24 include harvesting elements, which can include, but are not limited to, conventional gathering chains, snapping rolls, and the like, all supported on a suitable frame of the unit, in the well-known manner. It is contemplated, however, that harvesting units 24 of the invention have utility and can be configured for use to gather and harvest whole or partial stalks also, for use as silage, biomass, and the like, and therefore is not to be considered as limited to just ear harvesting applications.

Figure 3:
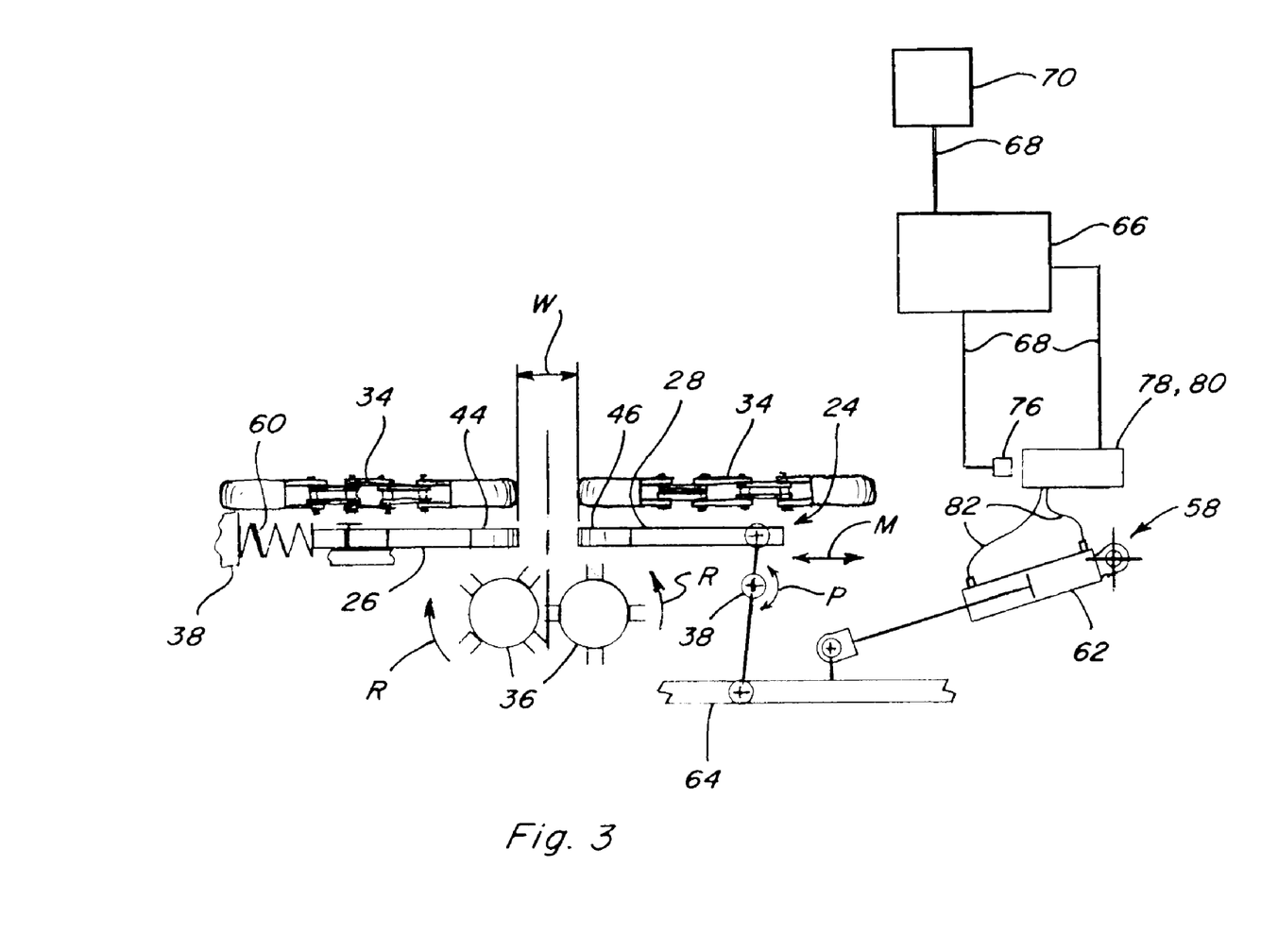
FIG. 3 is a fragmentary schematic end view of the unit of FIG. 2, showing aspects of the system of the invention.
Figure 4:
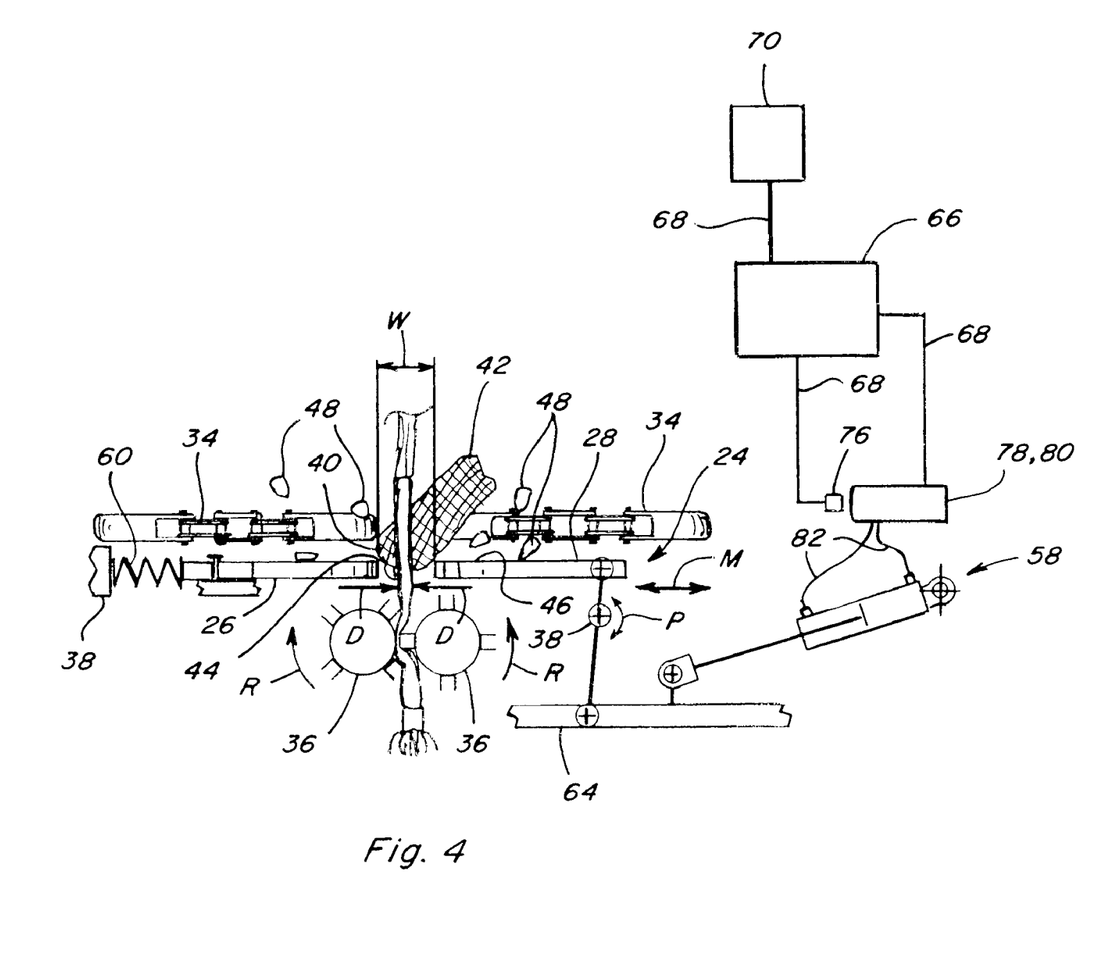
FIG. 4 is another fragmentary schematic end view of the unit, showing the deck plates spaced sufficiently far apart for partial induction of an ear of corn therebetween as a stalk is collapsed for detaching the ear, showing stripping and loss of kernels from the ear.
Figure 5:
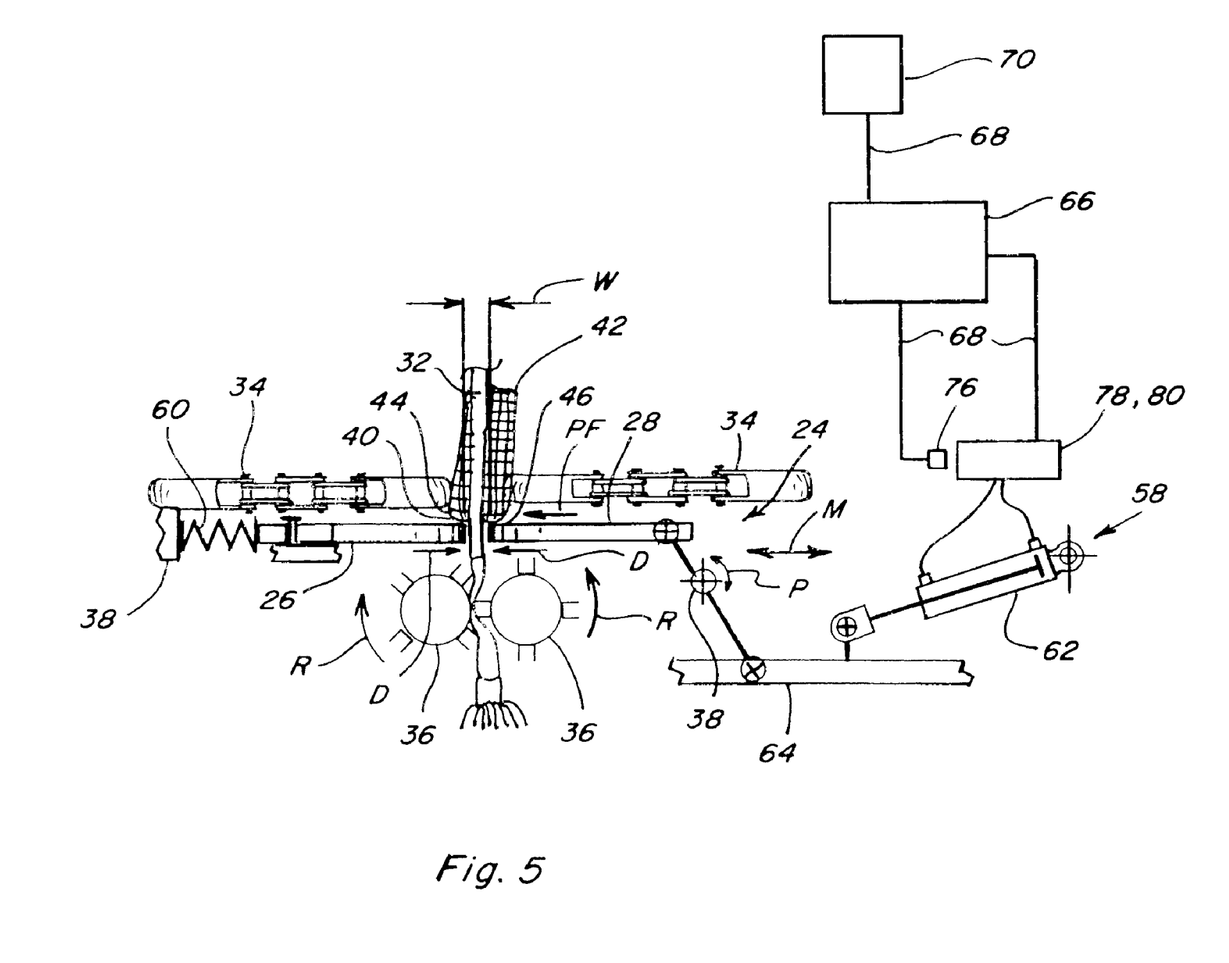
FIG. 5 is still another fragmentary schematic end view of the unit, showing the deck plates properly spaced apart for detaching an ear from a stalk as it is collapsed, without loss of kernels.

Referring also to FIGS. 2, 3, 4 and 5, they depict one harvesting unit 24 representative of the others, in schematic form. Each harvesting unit 24 includes a first deck plate 26 and a second deck plate 28. Deck plates 26 and 28 are spaced apart to define and bound a stalk receiving channel 30 therebetween having a width denoted by arrows W, for receiving a row of corn plants, denoted by row of stalks 32, located along a row centerline CL, as illustrated in FIG. 5, for harvesting ears 42 therefrom. Deck plates 26 and 28 are conventionally disposed below respective gathering chains 34 and above snapping rolls 36, all of which are supported on a frame 38 of the unit 24.

In operation, as harvesting unit 24 is moved in direction F, a row of stalks 32 will be inducted in succession into channel 30. Snapping rolls 36 will be counter rotated, as denoted by arrows R in FIGS. 3, 4 and 5, to grasp and collapse stalks 32 in succession, downwardly through channel 30, to bring lower ends 40 of ears 42 to bear against edges 44 and 46 of plates 26 and 28, with sufficient force and abruptness to detach ears 42 from stalks 32, as generally depicted in FIGS. 4 and 5. Detached ears 42 will then be carried rearwardly over deck plates 26 and 28 by gathering chains 34, to other conveyors of header 22 for induction into machine 20 for threshing and separation of the corn kernels therefrom in the well known manner.

As explained above, and as illustrated in FIG. 4, during operation, if width W is set so as to be significantly larger than a diameter D of the stalks 32, the upper ends of the stalks may sometimes be whipped about sufficiently violently such that ears can be detached and thrown or dropped from the header and lost, and is typically not desired. And, lower ends 40 of ears 42 can be drawn partially or wholly into channel 30 with sufficient force such that some kernels 48 can be detached or stripped therefrom and lost, as illustrated in FIG. 4. Also with a wider channel 30, there is a greater possibility of smaller ears being caught or lodged between edges 44 and 46 so as to disrupt stalk flow through channel 30 and possibly result in a build up of stalks and/or trash requiring stoppage of operation and manual removal. Such build ups can also push down stalks if not corrected. On the other hand, a larger width W can have advantages, namely, it allows aligning with a row of stalks more easily; it is less likely to push or lean stalks over when clear; and it more easily allows trash to fall channel 30, so as not to be conveyed into machine 20. In contrast, FIG. 5 shows a width W set to just contact or marginally pinch stalks 32, that is, exert a non-damaging sideward or lateral pinching force PF against the sides of the stalks, which also reduces or eliminates spaces between one or both edges 44, 46 and the side of the stalk, such that ears 42 will be detached, with reduced possibility of being pulled significantly into channel 30.

Figure 6:
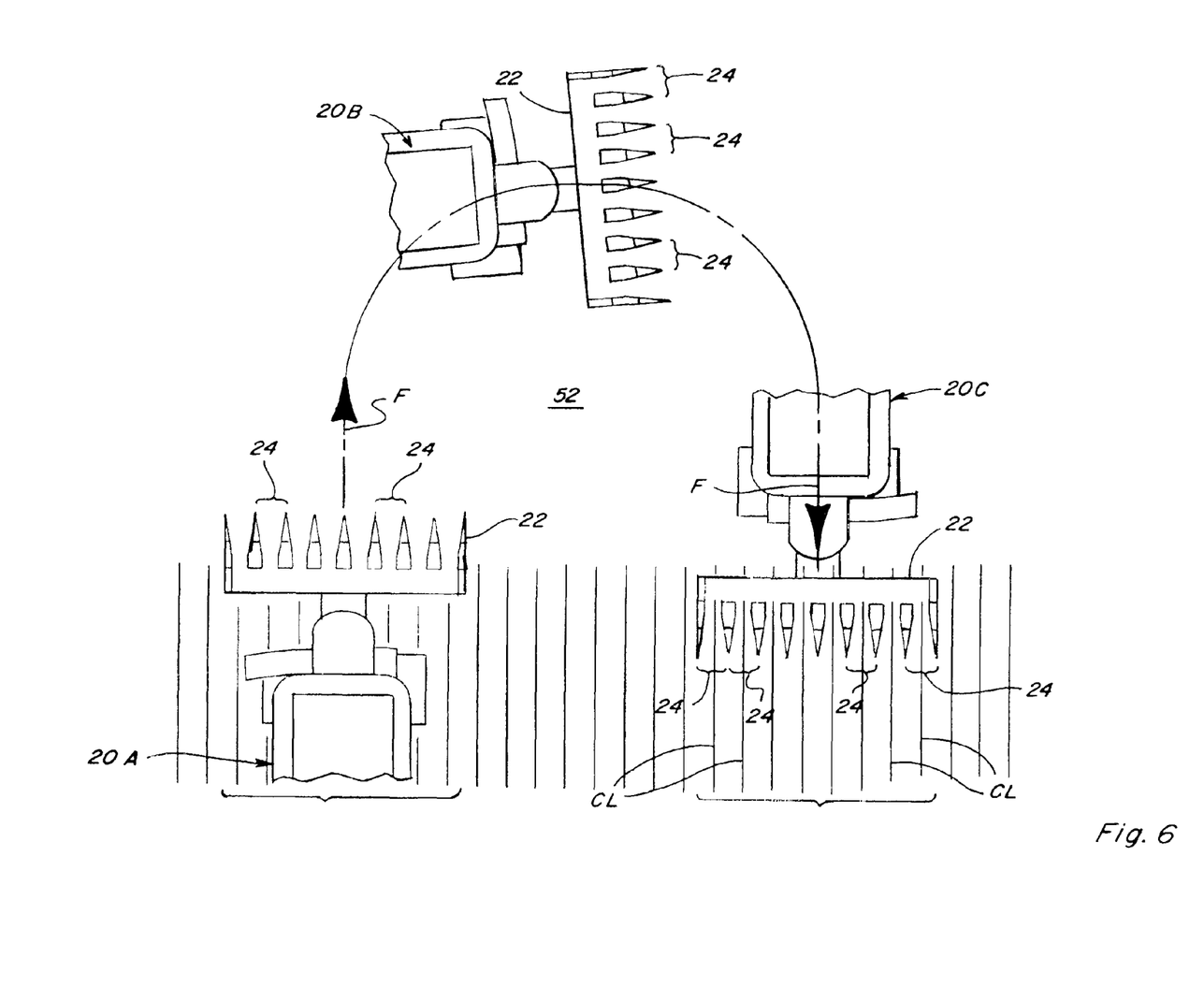
FIG. 6 is a simplified top view showing the harvesting machine in several operating modes, including leaving a stand of corn plants in a field, turning in a headland of the field with the header raised, and reentering the stand with the header lowered.
Figure 7:
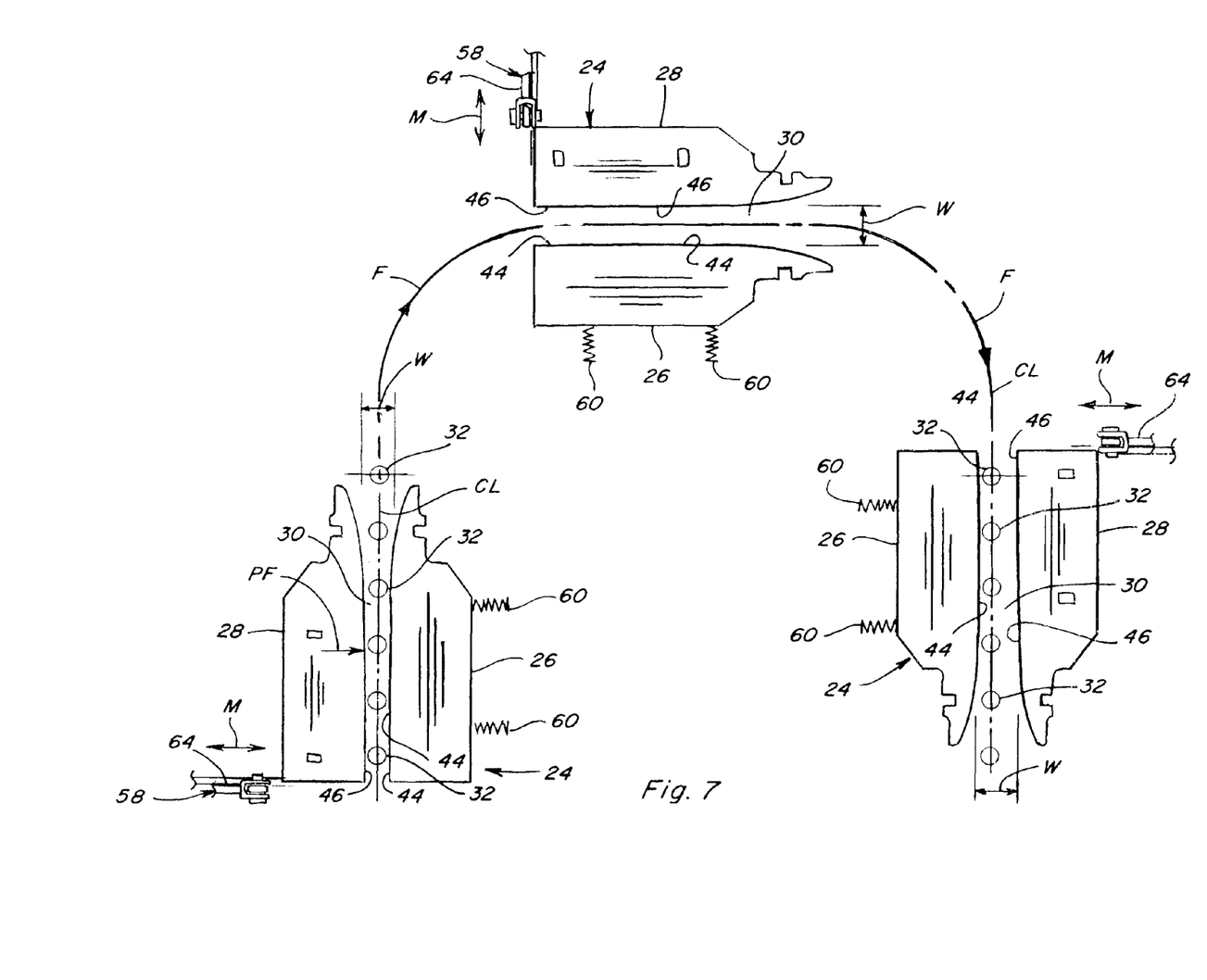
FIG. 7 is a simplified fragmentary top view of deck plates of a harvesting unit, in operative modes of the invention corresponding to the machine operating modes of FIG. 6.

Referring also to FIG. 6, commonly during a harvesting operation, a harvesting machine as denoted by number 20A will be driven as denoted by arrows F from a harvested swath or region 50 of a field, into an already harvested headland 52 or other open area, as denoted by machine 20B. In the headland 52 or other open region, machine 20B will be turned or travel to another region of the field containing standing corn, e.g., denoted by region 54, and then enter the standing corn to harvest it, as denoted by machine 20C. While harvesting corn, header 22 will typically be at a lower harvesting height (e.g., solid lines in FIG. 1) which will typically be within a range of from just a few inches above a ground surface 56 up to about 15 inches thereabove. When exiting the harvested region 50, or just thereafter, while in headland 52, header 22 will typically be raised to a height higher than the harvesting range, to facilitate turning and travel (e.g., 24 or 30 inches above surface 54), as illustrated in FIG. 1 by header 22 in dotted lines. Then, just before or while entering the standing corn, header 22 will be lowered to the harvesting height. This is typically effected by operation of a lift cylinder or cylinders 56 (FIG. 1) in the well known manner.

When entering standing corn, it is typically desirable that harvesting units 24 of header 22 be aligned with centerlines CL of the respective rows of corn, such that the stalks are inducted into channels 30 of units 24 without excessive breakage or being pushed or laid down in significant numbers. This would be facilitated by increasing the width W of the channels. But widening width W can result in the above noted problems, e.g., loss of kernels, stalks whipping about, lodging of ears in channel 30. Thus, it is evident that it would be advantageous to have the ability to open or widen channels 30, or at least to reduce pinching force PF, when entering standing corn to make it easier to align with the rows with less risk of damaging stalks and/or pushing them down. It would then be advantageous to narrow channels 30 once aligned with the row centerlines CL, to minimize entry of ears into channel 30 and resulting kernel loss, and to better control whipping of the upper ends of the stalks. Furthermore, it would be advantageous to have an ability to do this automatically, such that operator attention can be devoted to other pressing matters such as aligning the header with the rows of standing corn, avoiding obstacles and the like. This capability is provided by a system 58 of the invention for automatically controlling the position of at least one of the deck plates, explained next.

In the preferred configuration of system 58, one of the deck plates of each harvesting unit 24, here first deck plate 26, is equipped with biasing elements 60 configured to allow plate 26 to resiliently yield in the direction away from channel 30 and exert a component of pinching force PF against stalks 32 which displace plate 26 in the direction away from channel 30. Biasing elements 30 illustrated comprise compression springs, although it should be noted that it is contemplated that other types of resiliently yieldable mechanical or polymer springs, a cushioned fluid system, e.g., using an accumulator, or other resilient biasing system, could be used. In the absence of stalks in channel 30 bearing against plates 26, those plates will preferably bear against hard stops or be otherwise suitably retained from movement into channels 30. Second deck plate 28 of each harvesting unit 24 is mounted or connected with an actuator 62 via a pivoting linkage arrangement 64, as best shown in FIGS. 3-5, controllably operable for moving deck plate 28 toward and away from deck plate 26, as denoted by arrows M, for varying width W of channels 30, and for exerting another component of pinching force PF against stalks 32 located in channel 30, if desired.

A representative actuator 62 can comprise, for instance, a fluid cylinder operable to extend and retract to pivot linkage arrangement 64 about a fixed element of frame 38, as denoted by arrows P in FIGS. 3, 4 and 5, under control of a pressurized fluid system 78 of machine 20, including a valve arrangement 80 connected to actuator 62 via fluid lines 82 in a closed loop system utilizing a resolver or the like for determining the position of actuator 62 in the well known manner, and thus the position of plate 28 also. Alternatively, actuator 62 can comprise an electrical linear or rotary actuator or the like. Additionally, it should be noted that linkage arrangement 64 can be configured such that one actuator 62 moves all or several of the deck plates 28 of the harvesting units, or each harvesting unit can have a dedicated actuator.

Other preferred aspects of system 58 include a programmable processor based controller 66 connected in control of valve arrangement 80 of fluid system 78 via a suitable conductive path 68 which can be, for instance, a wiring harness, controller area network, or wireless communications network. Another aspect is an optional input device 70, for instance, located in an operator cabin 72 of machine 20 and comprising a potentiometer, touch screen, or the like, operable by an operator for inputting settings to controller 66. Still another aspect is a device 74 configured and operable indicating presence or occurrence of a triggering condition or event for which it will be desired to increase width W of channel 30 and/or reduce pinching force PF, e.g., entering a stand of corn or preparing to do so. Here, a suitable device 74 can be, but is not limited to, a sensor configured and operable for sensing a height of header 22, which can be an existing component of a header lift system of machine 20 or the like, or a pressure sensor configured and operable for sensing a force or pressure exerted against one or both deck plates 26, 28 of a harvesting unit or units, e.g., or indicator representative of presence of stalks in channels 30. If device 74 is a height sensor or other device which does not sense pressure or force between the deck plates, system 58 will also preferably include a device 76 configured and operable for indicating presence or occurrence of a condition or event for which it will be desired to reduce width W and/or increase force PF, e.g., indication of desired alignment with rows of stalks, or initiation of a time period sufficient for doing so, which can be, but is not limited to, a force or pressure sensor in connection with actuator 62, operable for sensing a force or pressure exerted thereby against one or more of deck plates 28, and changes in pinching force PF. Both device 74 and device 76 are preferably in connection with controller 66 via suitable conductive paths 68.

According to preferred steps of a method of the invention, when deck plates 28 are in a position such that widths W of channels 30 and/or pinching force PF is/are at or within a predetermined or set value or range for harvesting, controller 66 will automatically monitor device 74 for information indicative of cessation or interruption of harvesting, or cessation and resumption of harvesting, e.g., raising of header 22 to a predetermined non-harvesting height; and/or lowering from a raised height to a harvesting height, or absence of a predetermined force or pressure condition indicative of the presence of stalks in channels 30. When this triggering condition is present, controller 66 will responsively automatically control actuator or actuators 62 to move plates 28 to increase width W of channel 30, which will also decrease or eliminate any applied pinching forces PF exerted by those plates.

As a next step, after elapse of a predetermined time period, or change in a predetermined condition, e.g., sensing of a predetermined force condition by device 76 representative of desired harvesting operation, e.g., proper alignment and/or stalk flow within a channel 30, controller 66 will automatically control actuator or actuators 62 to move deck plates 28 toward deck plates 26 to decrease the width of channels 30, and/or exert the desired predetermined harvesting pinching force PF against the stalks located in the channels, and thereafter maintain this setting while harvesting and until an interruption or cessation of harvesting occurs, or a different setting is selected.

Also according to the invention, width W and/or pinching force PF can be set to a desired value, or to correct an observed condition. For instance, one or both of these settings can be adjusted to eliminate spaces about the stalks into which ears can enter before being detached, to reduce stripping of significant amounts of kernels from the ears, and/or so as to support the stalks to reduce or better control whipping as they are collapsed. In this regard, it is anticipated that harvesting conditions will or can change many times during a harvesting operation. For example, when going from a low or medium fertility region of a field to a high fertility region wherein the ears and/or stalks may be wider, and heavy foliage may be present, a larger channel width W or a lower pinching force PF may be desired or advantageous to reduce trash accumulation and the like. At other times, excessive whipping of the tops of the stalks may be present, or excessive kernel loss observed, e.g., on plates 26, 28, and/or striking the cabin windshield, such that a smaller width W and/or lower pinching force PF may be desired. At any force setting, while harvesting, controller 66 will automatically monitor the force or pressure condition, e.g., representative of pinching force PF, and responsively automatically maintain or vary the positions of deck plates 28 for maintaining the force within the set range, or at zero if set at that value.

As an operational advantage, system 58 is adaptable for automatically responding to a wide variety of different conditions. For example, upon elapse of the predetermined time period after initially entering a stand of corn, and movement of plates 28 toward plates 26, if no or only a low responsive force is sensed, this can signify that small diameter stalks are being harvested; that the stalk centerlines CL are offset toward the biased plate 26; and/or that one or more plates 26 are stuck in an open or partially open position. In response, system 58 can be configured to automatically move plates 28 to a set position; to continue to move plates 28 closer to plates 26 until feedback of the predetermined or set force PF is received, or until a limit is reached. In the latter instance, system 58 can be configured to output a signal to the operator. Or, even with only a sensed force within limits, some of the stalks may be observed by the operator to lean too far toward the biased plates, or be breaking, which can signify to the operator that a biased plate 26 or plates 26 may be stuck or another problem exists. Upon observing one of these conditions, an operator, or an automatic guidance system, if machine 20 is so equipped, may take a corrective action to realign the header with the stalk centerlines, e.g., move the header more toward the movable deck plate side. As this action is taken, system 58 can automatically adapt to it, by moving plates 28 to follow this realignment such that the set force, if any, is exerted against the stalks.

As another advantage, if the machine drifts or is steered off of the row centers such that the stalk centerlines CL are more toward the movable plate side, system 58 will sense a force increase and automatically adapt or compensate by controlling the positions of plates 28 to limit the force exerted such that the stalks will not be damaged or pushed over.

In light of all of the foregoing, it should thus be apparent to those skilled in the art that there has been shown and described a system and method of automatically controlling the deck plates of a corn header which provides one or more of the features and advantages set forth above. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A method for controlling deck plates of a harvesting unit of a corn header, comprising steps of:
   providing a harvesting unit having a first deck plate bounding one side of a stalk receiving channel, and a second deck plate bounding an opposite side of the channel and controlled by an actuator for movement toward the first deck plate for reducing a width of the channel, and movement away from the first deck plate for increasing the width of the channel;
   automatically monitoring by a processor an operating parameter of the header for information representative of occurrence of a predetermined event or condition and information representative of a force exerted against at least one of the deck plates, and if the information representative of the event or condition is present, then automatically controlling the actuator to increase the width of the channel, and then, after elapse of a predetermined time period or occurrence of a predetermined condition, and if the information representative of the force is indicative of the force being less than a predetermined value, then automatically reducing the width of the channel or the force to a predetermined value.

2. The method of claim 1, wherein the first deck plate is resiliently biased toward the channel.

3. The method of claim 1, wherein the predetermined event or condition comprises changing of a height of the header or a force acting on at least one of the deck plates.

4. The method of claim 1, comprising an additional step of:
   if the information representative of the force is indicative of the force being greater than a predetermined value, then automatically controlling the actuator to increase the width at least until the information representative of the force is indicative of a reduction of the force to less than a predetermined value.

5. The method of claim 4, comprising a step of setting at least one of the predetermined values of the force.

6. The method of claim 1, comprising a step of providing a processor based controller in connection with a sensor configured and operable for sensing the occurrence of the predetermined event or condition and outputting the information representative thereof to the controller, and a sensor configured and operable for sensing the force exerted against the at least one of the deck plates and outputting the information representative thereof to the controller, and wherein the controller is connected in operative control of the actuator and is configured and operable for automatically controlling the actuator responsive to the information received from the sensors.

7. The method of claim 1, wherein the time period will commence with reduction of a height of the header to a predetermined value.

8. The method of claim 1, comprising a step of setting the period of time.

9. A method for controlling deck plates of a harvesting unit of a corn header, comprising steps of:
   providing a harvesting unit having a first deck plate resiliently biased toward and bounding one side of a stalk receiving channel, and a second deck plate bounding an opposite side of the channel and controlled by an actuator for movement toward the first deck plate, and movement away from the first deck plate;
   automatically monitoring by a processor information representative of a height of the header and information representative of a force exerted against at least one of the deck plates, and:
   a. if the information representative of the height is indicative of a height greater than a predetermined value, and the width is less than a predetermined value, then automatically controlling the actuator to move the second deck plate away from the first deck plate, and:
      i. after lowering the header and elapse of a predetermined time period; and
      ii. if the information representative of the force is indicative of the force being less than a predetermined value,
      then automatically moving the second deck plate toward the first deck plate; and
   b. at any time, if the information representative of the force is indicative of a force greater than a predetermined value, then automatically controlling the actuator to move the second deck plate away from the first deck plate until the information representative of the force is indicative of a reduction of the force to less than a predetermined value.

10. The method of claim 9, comprising a step of providing a processor based controller in connection with a sensor configured and operable for sensing the height of the header and outputting the information representative thereof to the controller, and a sensor configured and operable for sensing the force exerted against the at least one of the deck plates and outputting the information representative thereof to the controller, and wherein the controller is connected in operative control of the actuator and is configured and operable for automatically controlling the actuator responsive to the information received from the sensors.

11. The method of claim 10, comprising a step of providing an input device in connection with the controller and operable for inputting at least one of the predetermined values of the force and the predetermined time period.

12. A system for controlling deck plates of a harvesting unit of a corn header, comprising:
   a first deck plate bounding one side of a stalk receiving channel of the harvesting unit, and a second deck plate bounding an opposite side of the channel;
   an actuator connected to the second deck plate and controllably operable for moving the second deck plate toward the first deck plate, and for moving the second deck plate away from the first deck plate;
   a processor based controller connected in operative control of the actuator;
   a sensor configured and operable for sensing the height of the header and outputting the information representative thereof to the controller;
   a sensor configured and operable for sensing a force exerted against the at least one of the deck plates and outputting the information representative thereof to the controller; and
   the controller being configured and operable for automatically monitoring the information representative of the height of the header and the information representative of the force exerted against the at least one of the deck plates, and if the information representative of the height is indicative of a predetermined raised height, then to automatically control the actuator to move the second deck plate away from the first deck plate, and, after lowering of the header and elapse of a predetermined time period, if the information representative of the force is indicative of the force being less than a predetermined value, then to automatically move the second deck plate toward the first deck plate.

13. The system of claim 12, wherein the controller is configured and operable such that if, at any time, the information representative of the force is indicative of a force greater than a predetermined value, then the controller will automatically control the actuator to move the second deck plate away from the first deck plate at least until the information representative of the force is indicative of a reduction of the force to a predetermined value or less.

14. The system of claim 12, further comprising an input device in connection with the controller and operable for inputting a value for the predetermined time period.

15. The system of claim 12, further comprising an input device in connection with the controller and operable for inputting at least one of the predetermined values of the force.

* * * * *